United States Patent [19]

Püntener

[11] 4,425,133
[45] Jan. 10, 1984

[54] USE OF 1:2 CHROMIUM OF COBALT COMPLEX DYES FOR DYEING LEATHER OR FURS

[75] Inventor: Alois Püntener, Rheinfelden, Switzerland

[73] Assignee: Ciba-Geigy Corporation, Ardsley, N.Y.

[21] Appl. No.: 359,734

[22] Filed: Mar. 19, 1982

[30] Foreign Application Priority Data

Mar. 23, 1981 [CH] Switzerland .......................... 1952/81

[51] Int. Cl.³ .......................... C09B 45/14; D06P 3/32
[52] U.S. Cl. ........................................... 8/437; 8/404; 8/684; 8/686; 8/691; 260/145 B
[58] Field of Search .................... 8/437, 404, 684, 686

[56] References Cited

U.S. PATENT DOCUMENTS 3,185,676  5/1965  Klein ................................ 260/145 A
3,939,140  2/1976  Meininger et al. ............. 260/145 A
4,171,300 10/1979  Donath et al. .................. 260/145 B

FOREIGN PATENT DOCUMENTS 642408  6/1962  Canada .
2027734  2/1980  United Kingdom .

*Primary Examiner*—A. Lionel Clingman
*Attorney, Agent, or Firm*—Edward McC. Roberts

[57] ABSTRACT

The dyes of the formula I indicated in patent claim 1 are suitable for dyeing furs and especially leather. They are preferably used as a mixture with a blue dye and a yellow dye for dyeing leather by the trichromatic process.

7 Claims, No Drawings

USE OF 1:2 CHROMIUM OF COBALT COMPLEX DYES FOR DYEING LEATHER OR FURS

The invention relates to the use of dyes of the formula I

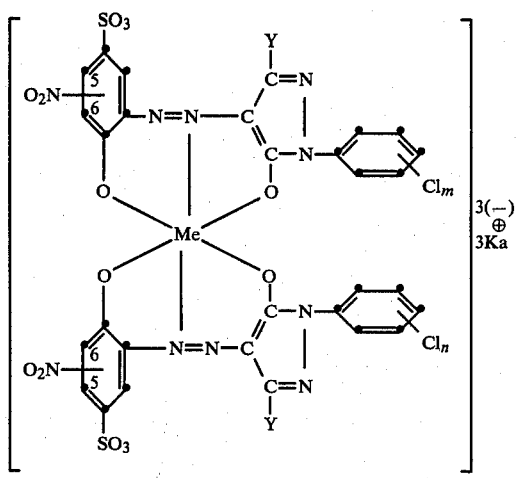

in which Me is chromium or cobalt, Ka$^\oplus$ is a cation, m is 1 or 2, n is 0, 1 or 2 and Y is methyl, —CONH$_2$ or —CO—NH—R, R being an alkyl group having 1–4 C atoms and the nitro groups being located in the 5-position or 6-position, for dyeing leather or furs.

Ka$^\oplus$ is a cation, for example a cation of an alkali metal, such as lithium or, preferably, sodium or potassium.

Ka$^\oplus$ can also be an ammonium cation or the ammonium salt of an organic amine.

The nitro groups are preferably located in the 6-position.

Preferably, n and m are each 1 and the chlorine is preferably attached in the m-position.

The alkyl group R can be straight-chain or branched. It is methyl, ethyl, n-propyl, isopropyl, n-butyl, isobutyl or tert.-butyl. Preferably, R is methyl.

In preferred dyes, Y is methyl and the phenyl radical on the pyrazolone carries a chlorine substituent in the m-position.

Examples of pyrazolones which are suitable for the dyes of the formula I indicated above are: 1-phenyl-3-methylpyrazol-5-one, 1-(2'-, 3'- or 4'-chlorophenyl)-3-methylpyrazol-5-one, 1-(2',5'- or 2',3'- or 3',4'-dichlorophenyl)-3-methylpyrazol-5-one or 1-phenyl-3-carbonamidopyrazol-5-one. The most preferred pyrazolone is 1-(3'-chlorophenyl)-3-methylpyrazol-5-one.

The 1:2 chromium or cobalt complexes are prepared in a customary manner, for example by reacting the metal-free azo dyes in a ratio of 1:2 with a chromium or cobalt donor, for example cobalt sulfate or acetate or chromium sulfate or formate, in a slightly alkaline, neutral or slightly acid solution.

The simple salts mentioned above can also be used in the presence of complexing agents, for example tartaric acid, salicylic acid or lactic acid, or can be used in the form of complex salts, such as salts of chromosalicylic acid. The metal donors are employed in a stoichiometric amount or in excess. Mixtures of monoazo dyes or single-substance monoazo dyes can be metallised. In the first case, a mixture of symmetrical and asymmetrical metal complexes is obtained. Entirely asymmetric complexes are obtained by first preparing the 1:1 complex by a known method and then preparing the corresponding 1:2 complex, using further monoazo dye. If desired, it is also possible to employ mixtures of metal donors.

The 1:2 chromium or cobalt complexes are used for dyeing furs or, preferably leather, all types of leather being suitable, for example chrome leather, re-tanned leather or suede leather produced from goatskin, cowhide or pigskin.

Red, reddish brown or yellowish red dyeings with very good fastness properties, in particular fastness to light and wet processing, are obtained.

The dyes are preferably used for dyeing leather by means of mixtures of dyes, particularly as a mixture with a blue 1:2 metal complex dye and a yellow or yellowish brown 1:2 metal complex dye, which makes it possible for the first time to dye leather by the trichromatic process. In this context, grey or violet dyes are also described as blue dyes.

It is preferable to use a mixture of dyes containing (a) a red, reddish brown or yellowish red 1:2 chromium or cobalt complex of the formula I indicated above, (b) a blue 1:2 chromium or cobalt complex of the dye of the formula II

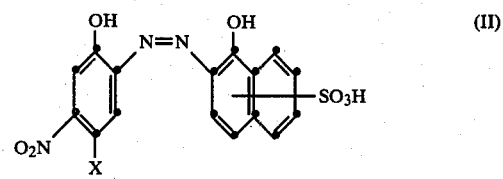

in which X is hydrogen, chlorine, methyl or methoxy, and (c) a yellow 1:2 cobalt complex of the dye of the formula III

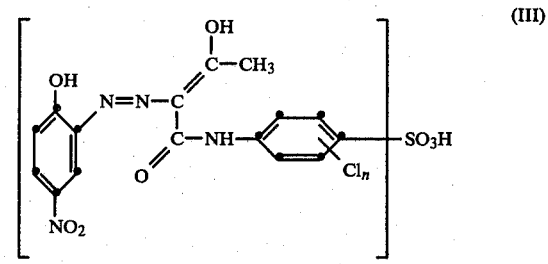

in which n is an integer from 0 to 2, or a yellowish brown 1:2 cobalt complex of the dye of the formula IV

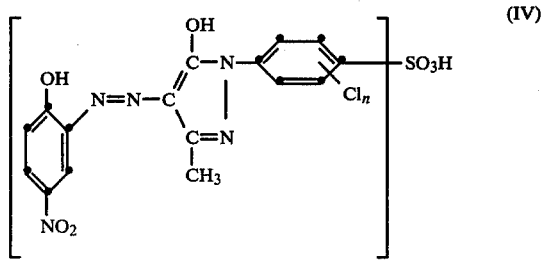

in which n is as defined above.

The examples which follow serve to illustrate the invention without limiting it thereto. The parts and percentages are by weight. The temperatures are quoted in degrees Centigrade.

EXAMPLE 1

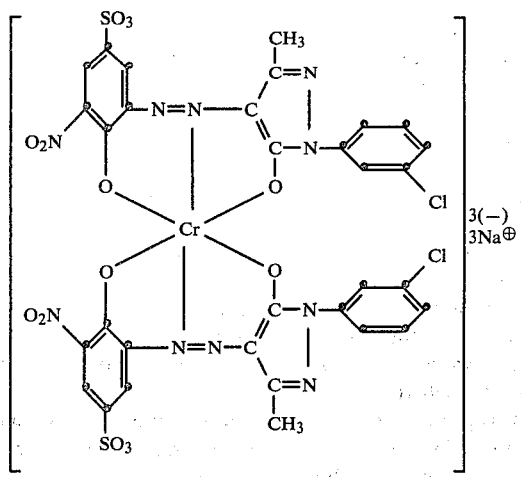

45 parts of the monoazo dye obtained by diazotising 6-nitro-2-amino-1-hydroxybenzene-4-sulfonic acid and coupling the product with 1-(3'-chlorophenyl)-3-methyl-pyrazol-5-one, are dissolved in 1,000 parts of water warmed to 80°, by adding 4 parts of sodium hydroxide, and the solution is treated with 120 parts of a solution of sodium chromosalicylate containing 2.6% of chromium, and is kept under reflux until the chroming is complete. The water is removed on a rotary evaporator. The resulting chromium complex is a dark powder which is readily soluble in water and dyes leather in full red colour shades which have excellent fastness properties.

EXAMPLE 2

The metallisation of the monoazo dye used in Example 1 is carried out by means of corresponding quantities of cobalt salts instead of chromium salts. A dye which dyes leather or furs reddish brown is obtained.

EXAMPLE 3

The procedure of Example 1 is followed, but the dye is precipitated by adding potassium chloride instead of evaporating the reaction solution on a rotary evaporator. This gives the dye analogous to that in Example 1, in which most of the sodium ion in the dye has been replaced by the potassium ion. The corresponding dye dyes leather in the same shade, and the resulting fastness properties are equivalent.

EXAMPLES 4

The process is carried out analogously to Example 3, using the corresponding cobalt complex from Example 2. The corresponding dye in which, however, the cation is potassium, is obtained in a similar manner.

EXAMPLES 5–14

The procedure described in Examples 1–4 is followed, but the monoazo dyes listed in Table I are used. After metallisation with the metal indicated in column 3, the corresponding 1:2 metal complexes are obtained; these dye leather in the shades indicated in column 4.

TABLE I

| Example | Monoazo dye | Metal | Shade |
|---|---|---|---|
| 5 | ![structure] | Cr | red |
| 6 | ![structure] | Co | reddish brown |
| 7 | ![structure] | Co | reddish brown |
| 8 | ![structure] | Cr | red |

TABLE I-continued

| Example | Monoazo dye | Metal | Shade |
|---|---|---|---|
| 9 | 6-nitro-2-hydroxy-4-sulfophenylazo coupled with 1-(2',3'-dichlorophenyl)-3-methylpyrazol-5-one | Cr | red |
| 10 | 6-nitro-2-hydroxy-4-sulfophenylazo coupled with 1-(2',3'-dichlorophenyl)-3-methylpyrazol-5-one | Co | reddish brown |
| 11 | 6-nitro-2-hydroxy-4-sulfophenylazo coupled with 1-(2',5'-dichlorophenyl)-3-methylpyrazol-5-one | Co | reddish brown |
| 12 | 6-nitro-2-hydroxy-4-sulfophenylazo coupled with 1-(2',4'-dichlorophenyl)-3-methylpyrazol-5-one | Cr | red |
| 13 | 6-nitro-2-hydroxy-4-sulfophenylazo coupled with 1-(3',4'-dichlorophenyl)-3-methylpyrazol-5-one | Cr | red |
| 14 | 6-nitro-2-hydroxy-4-sulfophenylazo coupled with 1-(3',4'-dichlorophenyl)-3-methylpyrazol-5-one | Co | reddish brown |

EXAMPLE 15

22.5 parts of the monoazo dye obtained by diazotising 6-nitro-2-amino-1-hydroxybenzene-4-sulfonic acid and coupling the product with 1-(3'-chlorophenyl)-3-methylpyrazol-5-one, and 21 parts of the monoazo dye obtained by diazotising 6-nitro-2-amino-1-hydroxybenzene-4-sulfonic acid and coupling the product with 1-phenyl-3-methylpyrazol-5-one, are dissolved in 1,000 parts of water warmed to 80°, by adding 4 parts of sodium hydroxide, and the product is metallised and isolated as in Example 1. The resulting dye powder dyes wool, polyamide and leather in a red colour shade which has excellent fastness properties; it is a mixture of metal complexes of the following formulae:

The corresponding mixture of dyes containing potassium instead of sodium as the cation is obtained by following a procedure analogous to that of Example 3.

EXAMPLE 16

The metallisation of the mixture of monoazo dyes used in Example 15 is effected by means of the corresponding quantities of cobalt salts instead of chromium salts. The cobalt complexes having the same ligands as in Example 15 are obtained analogously.

EXAMPLE 17

The 1:1 chromium complex compound containing 41.9 parts of the dye obtained from diazotised 6-nitro-2-amino-phenol-4-sulfonic acid and 1-phenyl-3-methyl-pyrazol-5-one and 5.2 parts of chromium, and 45 parts of the monoazo dye obtained by diazotising 6-nitro-2-amino-1-hydroxybenzene-4-sulfonic acid and coupling the product with 1-(3'-chlorophenyl)-3-methylpyrazol-5-one, are introduced successively into 1,000 parts of water, and the solution is warmed to 80°. A neutral pH value is maintained by means of 2-molar sodium hydroxide solution. When the addition reaction is complete, the water is removed on a rotary evaporator. The resulting sample of dye dyes leather in a red colour.

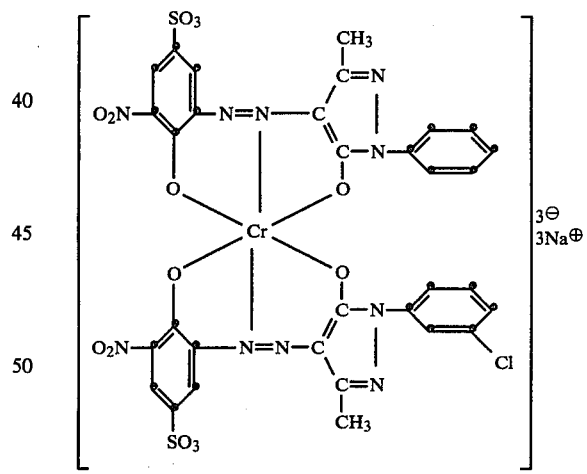

The corresponding dye containing potassium as the cation is obtained by following a procedure analogous to that of Example 3.

EXAMPLES 18–25

The procedure followed is analogous to that of Example 17, but the 1:1 chromium complex dyes and monoazo dyes described in Table II are used. The corresponding 1:2 metal complex dyes are obtained; these dye leather in the shades indicated in column 4.

TABLE II

| Example | 1:1 chromium complex | Monoazo dye | Shade |
|---|---|---|---|
| 18 | 3-NO2, 2-OH, 5-SO3H phenylazo pyrazolone, N-phenyl | 3-NO2, 2-OH, 5-SO3H phenylazo pyrazolone, N-(4-chlorophenyl) | red |
| 19 | 3-NO2, 2-OH, 5-SO3H phenylazo pyrazolone, N-phenyl | 3-NO2, 2-OH, 5-SO3H phenylazo pyrazolone, N-(2-chlorophenyl) | red |
| 20 | 3-NO2, 2-OH, 5-SO3H phenylazo pyrazolone, N-phenyl | 3-NO2, 2-OH, 5-SO3H phenylazo pyrazolone, N-(2,5-dichlorophenyl) | red |
| 21 | 3-NO2, 2-OH, 5-SO3H phenylazo pyrazolone, N-(3-chlorophenyl) | 3-NO2, 2-OH, 5-SO3H phenylazo pyrazolone, N-(2,5-dichlorophenyl) | red |
| 22 | 3-NO2, 2-OH, 5-SO3H phenylazo pyrazolone, N-(3-chlorophenyl) | 3-NO2, 2-OH, 5-SO3H phenylazo pyrazolone, N-(4-chlorophenyl) | red |
| 23 | 3-NO2, 2-OH, 5-SO3H phenylazo pyrazolone, N-(3-chlorophenyl) | 3-NO2, 2-OH, 5-SO3H phenylazo pyrazolone, N-(2-chlorophenyl) | red |
| 24 | 3-NO2, 2-OH, 5-SO3H phenylazo pyrazolone, N-(3-chlorophenyl) | 4-NO2, 2-OH, 5-SO3H phenylazo pyrazolone, N-(3-chlorophenyl) | reddish brown |

TABLE II-continued

| Example | 1:1 chromium complex | Monoazo dye | Shade |
|---|---|---|---|
| 25 | (structure) | (structure) | red |

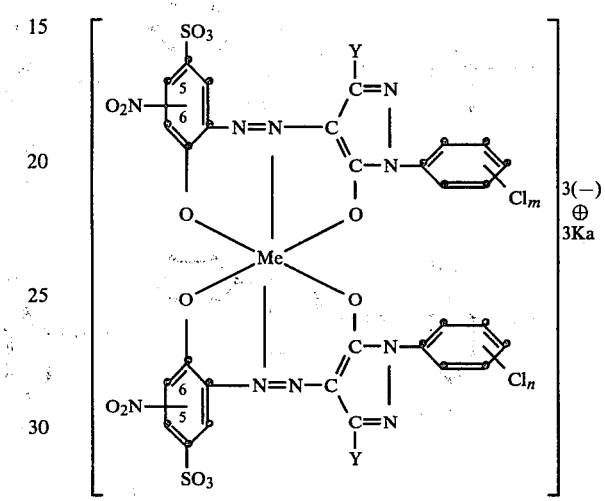

Dyeing instructions for leather 100 parts of suede garment leather are wetted back for 2 hours at 50° in a solution of 1,000 parts of water and 2 parts of 24% ammonia, and are then dyed for 1 hour at 60° in a solution of 1,000 parts of water, 2 parts of 24% ammonia and 3 parts of the cobalted dye according to Example 2. A solution of 40 parts of water and 4 parts of 85% formic acid is then added and dyeing is continued for a further 30 minutes. The leather is then thoroughly rinsed and, if desired, also treated for 30 minutes at 50° with 2 parts of a dicyandiamide/formaldehyde condensation product. A reddish brown dyeing which has good fastness properties is obtained.

What is claimed is:

1. A method for dyeing leather or furs, comprising the step of applying thereto a dye composition whose active dyeing ingredient consists essentially of a dye of the formula in which Me is chromium or cobalt, $Ka^{\oplus}$ is a cation, m is 1 or 2, n is 0, 1 or 2 and Y is methyl, $-CONH_2$ or $-CO-NH-R$, wherein R is an alkyl group having 1–4 C atoms, and wherein each of the nitro groups is located at a 5-position or a 6-position.

2. The method of claim 1, wherein both of the nitro groups are located in the 6-positions.

3. The method of either of claims 1 or 2, wherein m and n are each 1.

4. The method of claim 1, wherein m and n are each 1 and both chlorine substituents are attached in the m-positions.

5. The method of claim 1, wherein Y is methyl.

6. The method of claim 1, wherein both of the nitro groups are located in the 6-positions, m and n are each 1, both chlorine substituents are attached in the m-positions and Y is methyl.

7. The method of claim 2, wherein m and n are each 1 and both chlorine substituents in the m-positions.

* * * * *